(12) United States Patent
Chung et al.

(10) Patent No.: US 11,395,961 B2
(45) Date of Patent: Jul. 26, 2022

(54) PORTABLE KEY OPERATION APPARATUS

(71) Applicant: Samsung Electronics Co., Ltd., Gyeonggi-do (KR)

(72) Inventors: Jaewoong Chung, Gyeonggi-do (KR); Wonkyu Sung, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/055,728

(22) PCT Filed: Apr. 25, 2019

(86) PCT No.: PCT/KR2019/004992
§ 371 (c)(1),
(2) Date: Nov. 16, 2020

(87) PCT Pub. No.: WO2019/221418
PCT Pub. Date: Nov. 21, 2019

(65) Prior Publication Data
US 2021/0205699 A1    Jul. 8, 2021

(30) Foreign Application Priority Data

May 16, 2018 (KR) .................. 10-2018-0056077

(51) Int. Cl.
*A63F 13/98* (2014.01)
*A63F 13/92* (2014.01)
(Continued)

(52) U.S. Cl.
CPC ............ *A63F 13/24* (2014.09); *A63F 13/235* (2014.09); *A63F 13/92* (2014.09); *A63F 13/98* (2014.09);
(Continued)

(58) Field of Classification Search
CPC ......... A63F 13/92; A63F 13/98; G06F 1/1624
See application file for complete search history.

(56) References Cited

U.S. PATENT DOCUMENTS 9,855,498 B2   1/2018 Townley et al.
2009/0286574 A1  11/2009 Kim et al.
(Continued)

FOREIGN PATENT DOCUMENTS

EP     2 923 745    11/2015
JP      3162279    8/2010
(Continued)

OTHER PUBLICATIONS

PCT/ISA/210 Search Report issued on PCT/KR2019/004992, dated Aug. 5, 2019, pp. 5.
(Continued)

*Primary Examiner* — Jay Trent Liddle
(74) *Attorney, Agent, or Firm* — The Farrell Law Firm, P.C.

(57) ABSTRACT

A key operating device according to various embodiments of the disclosure includes: first and second operating portions movable in a sliding manner in directions being away from or close to each other while maintaining a state of being parallel with each other; a seating portion disposed in an overlapping manner between the first and second operating portions while maintaining a state of being parallel with each of the first and second operating portions, and disposed to be parallel between the first and second operating portions by moving downward depending on a sliding movement of the first and second operating portions; and at least one connecting device which connects each of the first and second operating portions and the seating portion, wherein the seating portion is restricted in a downward movement when in a state of overlapping with each of the first and second operating portions, and is rotatable by means of the connecting device and thus is movable downward when it is no longer in the state of overlapping with each of the first and second operating portions.

15 Claims, 29 Drawing Sheets

(51) Int. Cl.
*A63F 13/24* (2014.01)
*A63F 13/235* (2014.01)
*G06F 3/02* (2006.01)

(52) U.S. Cl.
CPC ........ *G06F 3/02* (2013.01); *A63F 2300/1031* (2013.01); *A63F 2300/1043* (2013.01)

(56) References Cited

U.S. PATENT DOCUMENTS

| | | | | |
|---|---|---|---|---|
| 2013/0341214 | A1* | 12/2013 | King | A63F 13/92 |
| | | | | 206/216 |
| 2014/0179437 | A1 | 6/2014 | King et al. | |
| 2014/0274394 | A1 | 9/2014 | Willis | |
| 2014/0378183 | A1* | 12/2014 | Xiong | G06F 1/1647 |
| | | | | 455/556.1 |
| 2015/0205328 | A1* | 7/2015 | Lin | A63F 13/98 |
| | | | | 361/679.44 |
| 2015/0273325 | A1 | 10/2015 | Falc et al. | |
| 2016/0044804 | A1* | 2/2016 | Nakamura | G06F 1/1622 |
| | | | | 361/679.01 |
| 2016/0107082 | A1 | 4/2016 | Song et al. | |
| 2017/0106275 | A1 | 4/2017 | Tsuchiya et al. | |
| 2017/0315586 | A1 | 11/2017 | Townley et al. | |
| 2018/0021674 | A1 | 1/2018 | Nakayama et al. | |
| 2018/0133594 | A1* | 5/2018 | Guo | A63F 13/245 |

FOREIGN PATENT DOCUMENTS

| | | |
|---|---|---|
| KR | 1020050033186 | 4/2005 |
| KR | 1020110116892 | 10/2011 |
| KR | 1020120007334 | 1/2012 |
| KR | 1020120016775 | 2/2012 |
| KR | 101020120016775 | 2/2012 |
| KR | 200471339 | 2/2014 |
| KR | 101463818 | 11/2014 |

OTHER PUBLICATIONS

PCT/ISA/237 Written Opinion issued on PCT/KR2019/004992, dated Aug. 5, 2019, pp. 6.
European Search Report dated Apr. 26, 2021 issued in counterpart application No. 19803779.8-1210, 7 pages.

* cited by examiner

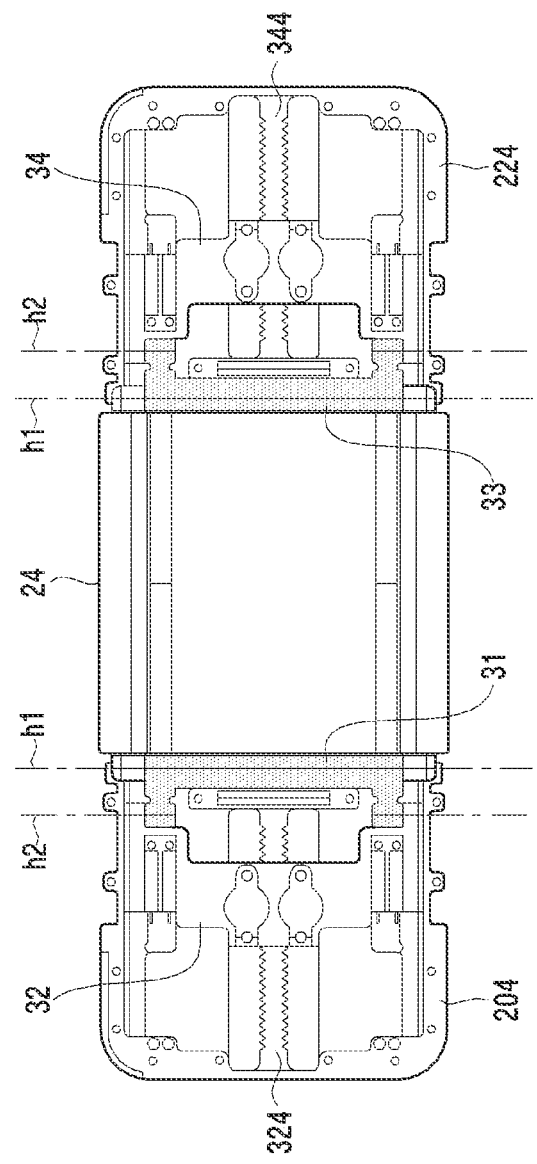

PORTABLE KEY OPERATION APPARATUS

PRIORITY

This application is a National Phase Entry of International Application No. PCT/KR2019/004992, which was filed on Apr. 25, 2019, and claims priority to Korean Patent Application No. 10-2018-0056077, filed in the Korean Intellectual Property Office on May 16, 2018, the content of each of which is incorporated herein by reference.

TECHNICAL FIELD

Various embodiments of the disclosure relate to a portable key operating device capable of wirelessly communicating with an electronic device.

BACKGROUND ART

With the advancement of the game industry and the enhanced performance of electronic devices, games played on computers or consoles have been gradually expanded to the electronic devices. Therefore, the electronic devices may also require controllers to enjoy the games more actively and professionally.

To this end, there may be a need for a dedicated game pad that can be used as a compact controller and can be used by easily and stably connecting the electronic device, and there may be a need for a game pad of which a shape or operation matches the electronic device and which is easy to operate. For example, a separate joystick-type game pad may be used as the game pad of the electronic device.

DISCLOSURE OF INVENTION

Technical Problem

However, since the joystick-type game pad is used in such a manner that the electronic device is mounted on a separate support, an overall volume is large, which may result in poor portability, a shape with no sense of unity with the electronic device, and docking without reliability and stability.

A portable key operating device according to various embodiments of the disclosure may provide immersion and usability of games as much as possible, may enable docking of the electronic device in a reliable and unified manner, and may provide various usability and convenience to users.

The portable key operating device according to various embodiments of the disclosure may provide a user-friendly usage environment by securing a reliable docking structure and operability.

Solution to Problem

A portable key operating device according to various embodiments of the disclosure includes first and second operating portions movable in a sliding manner in directions being away from or close to each other while maintaining a state of being parallel with each other, a seating portion disposed in an overlapping manner between the first and second operating portions while maintaining a state of being parallel with each of the first and second operating portions, and disposed to be parallel between the first and second operating portions by moving downward depending on a sliding movement of the first and second operating portions, and at least one connecting device which connects each of the first and second operating portions and the seating portion. The seating portion may be restricted in a downward movement when in a state of overlapping with each of the first and second operating portions, and may be rotatable by means of the connecting device and thus be movable downward when it is no longer in the state of overlapping with each of the first and second operating portions.

Advantageous Effects of Invention

A key operating device according to an embodiment of the disclosure can be conveniently carried since it is compact when carried, and can be conveniently used as a game pad of an electronic device by mounting the electronic device with a simple sliding operation when playing games.

A key operating device according to an embodiment of the disclosure can conveniently mount an electronic device or detach the mounted electronic device.

BRIEF DESCRIPTION OF DRAWINGS

FIG. 11 is a plan view illustrating a mounting state of each of first and second connecting devices mounted on a key operating device in a closed state according to various embodiments of the disclosure;

BEST MODE FOR CARRYING OUT THE INVENTION

Figure 1:
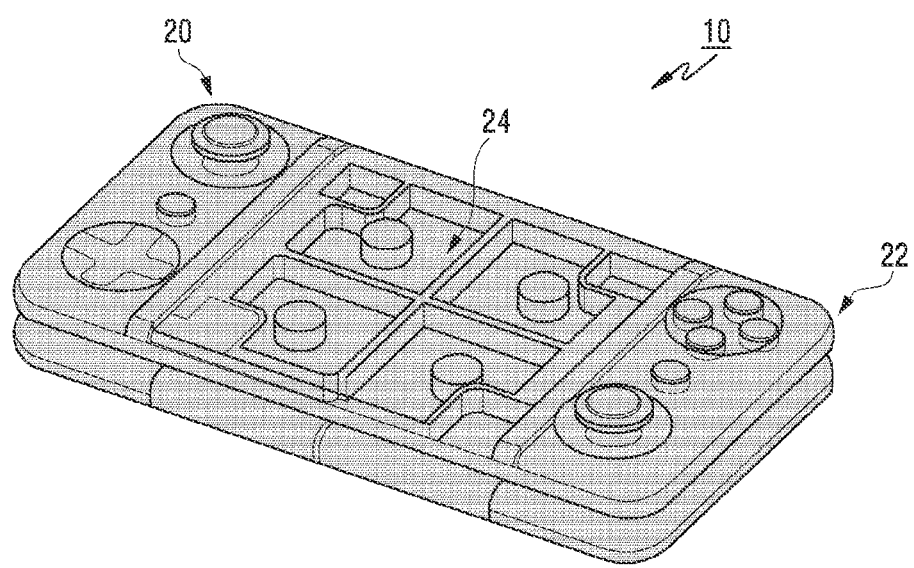
FIG. 1 is a perspective view illustrating a key operating device in a closed state according to various embodiments of the disclosure.

Hereinafter, various embodiments of the disclosure are described with reference to the accompanying drawings. However, it should be appreciated that this is not intended to limit the technological features set forth herein to particular embodiments and include various changes, equivalents, or replacements for an embodiment of the disclosure. With regard to the description of the drawings, similar reference numerals may be used to refer to similar or related elements.

An electronic device according to various embodiments of the disclosure may include at least one of, for example, a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device (e.g., smart glasses, a Head-Mounted Display (HMD), electronic clothes, an electronic bracelet, an electronic necklace, an electronic appcessory, an electronic tattoo, a smart mirror, or a smart watch).

FIG. 1 is a perspective view illustrating a key operating device in a closed state according to various embodiments of the disclosure.

Figure 13A:
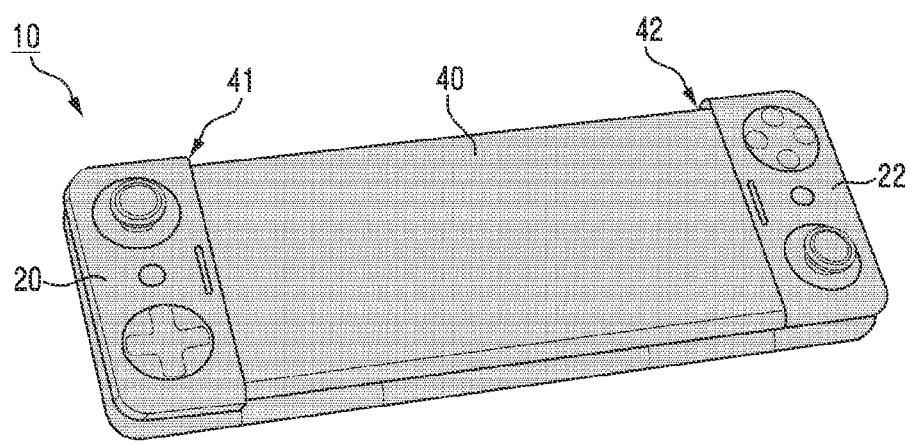
FIG. 13A is a perspective view illustrating a state where an electronic device is mounted on a key operating device according to various embodiments of the disclosure.

Referring to FIG. 1, a portable key operating device 10 according to various embodiments may be a game pad that can be used by being mounted on an electronic device (e.g., an electronic device 40 of FIG. 13A). However, the key operating device 10 according to various embodiments is not necessarily limited to the game pad, and may be utilized as an auxiliary controller of the electronic device or an auxiliary external device.

Figure 6:
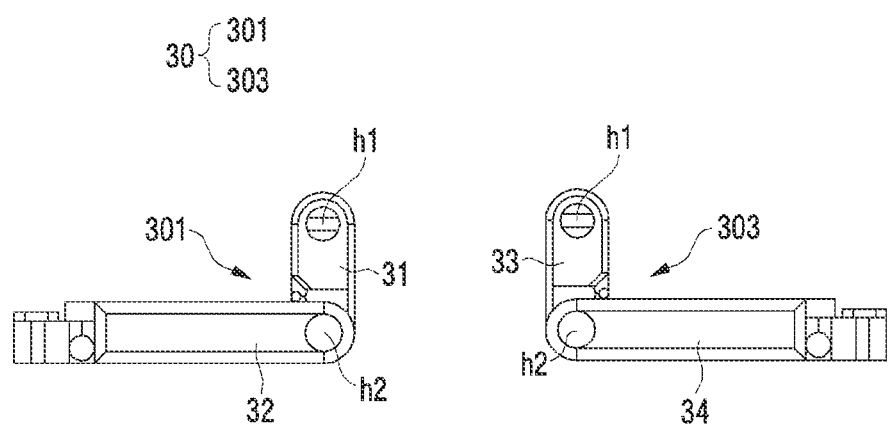
FIG. 6 is a front view illustrating each of first and second connecting devices mounted to a key operating device in a closed state according to various embodiments of the disclosure.

The key operating device 10 according to various embodiments may include first and second operating portions 20 and 22, a seating portion 24, and a connecting device 30 (shown in FIG. 6). The key operating device 10 may be conveniently carried when in a first mode (a closed state). When in a second mode (an open state), the electronic device (e.g., an electronic device 40 of FIG. 13A) may be mounted to perform a game while watching a display (e.g., a display 240 of FIG. 15A) of the mounted electronic device. The first and second operating portions 20 and 22 may transmit/receive a signal by using a wired or wireless scheme. For example, a Flexible Printed. Circuit Board (FPCB) may be used in the wired scheme, and a short-range communication module may be used in the wireless scheme. In addition, each of the first and second operating portions 20 and 22 and the seating portion 24 may transmit/receive a signal with respect to the electronic device by using the wired or wireless scheme.

The key operating device 10 according to various embodiments may communication with the electronic device by using wireless communication. For example, the wireless communication may use Bluetooth as short-range wireless communication. The key operating device 10 may operate as a controller of the electronic device by using wireless communication.

The first operating portion 20 according to various embodiments may have a first sub-PCB and a first key pad disposed on the first sub-PCB, and the second operating portion 22 may have a second sub-PCB and a second key pad disposed on the second sub-PCB. The seating portion 24 may have a display, battery, main PCB, wireless charging coil, AP, Bluetooth module, or the like (not shown) disposed thereon.

Figure 2A:
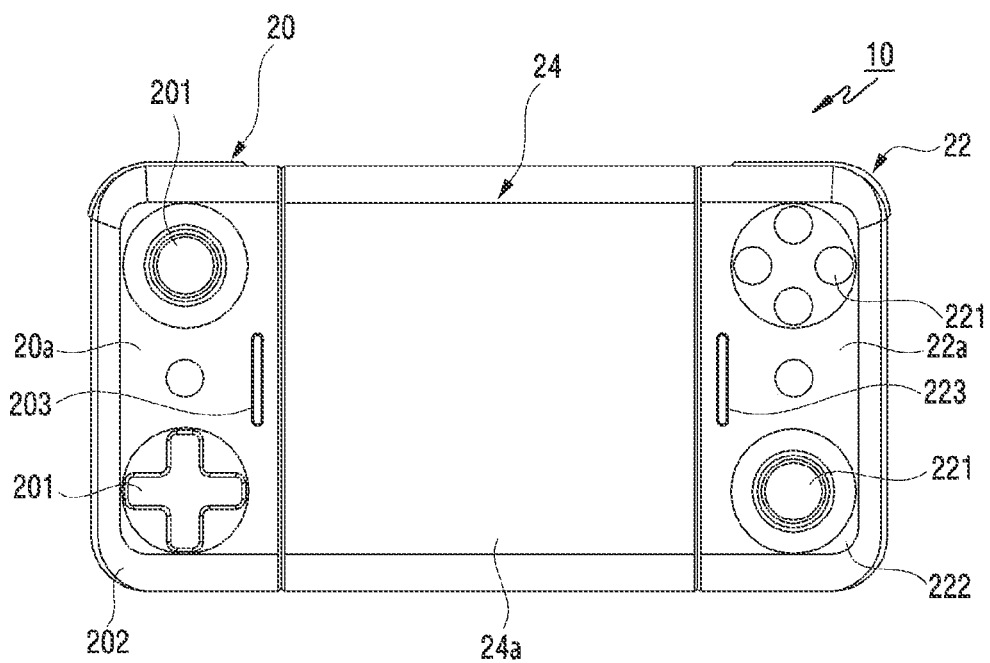
FIG. 2A is a plan view illustrating a key operating device in a closed state according to various embodiments of the disclosure.
Figure 2B:
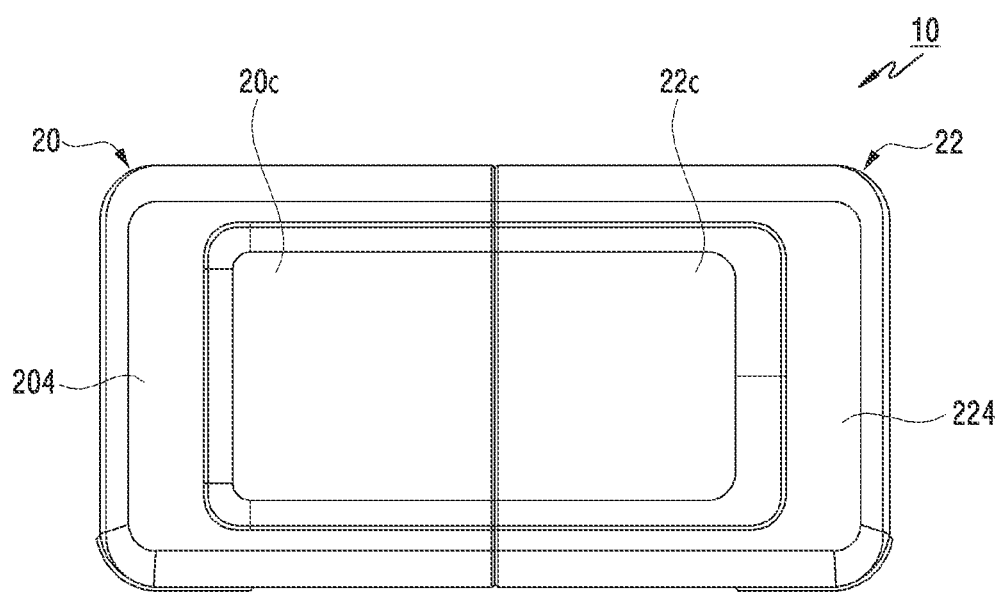
FIG. 2B is a bottom view illustrating a key operating device in a closed state according to various embodiments of the disclosure.
Figure 2C:
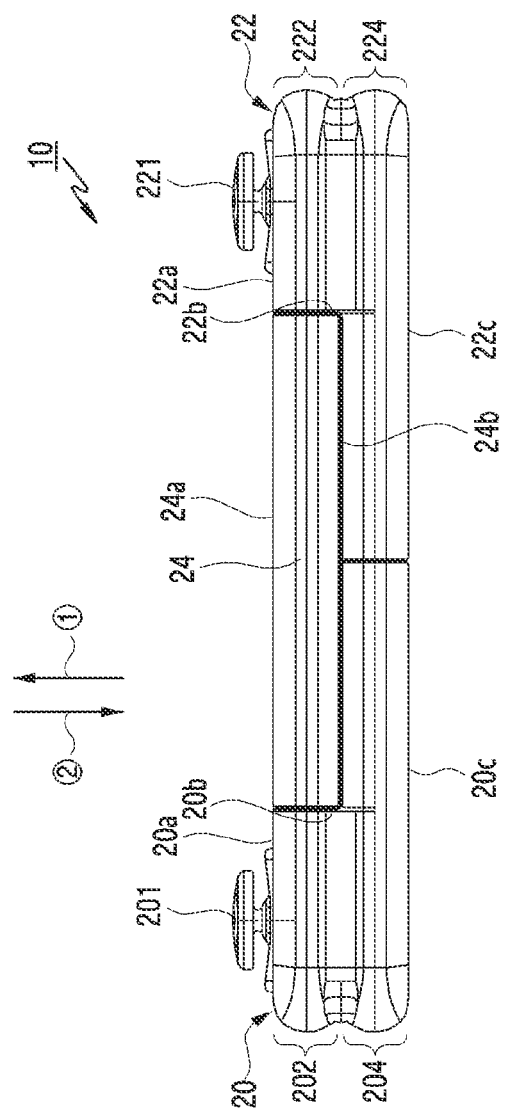
FIG. 2C is a front view illustrating a key operating device in a closed state according to various embodiments of the disclosure.
Figure 2D:
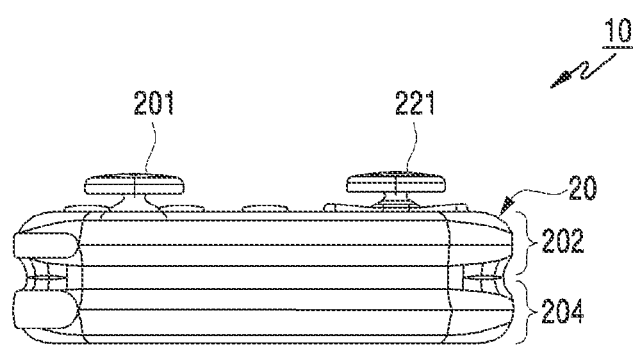
FIG. 2D is one side view illustrating a key operating device in a closed state according to various embodiments of the disclosure.
Figure 3:
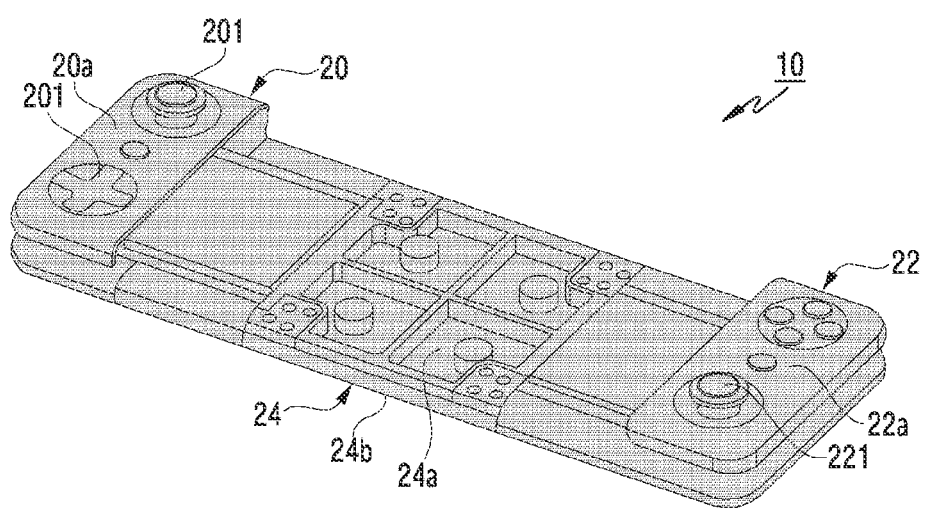
FIG. 3 is a perspective view illustrating a key operating device in an open state according to various embodiments of the disclosure.
Figure 4A:
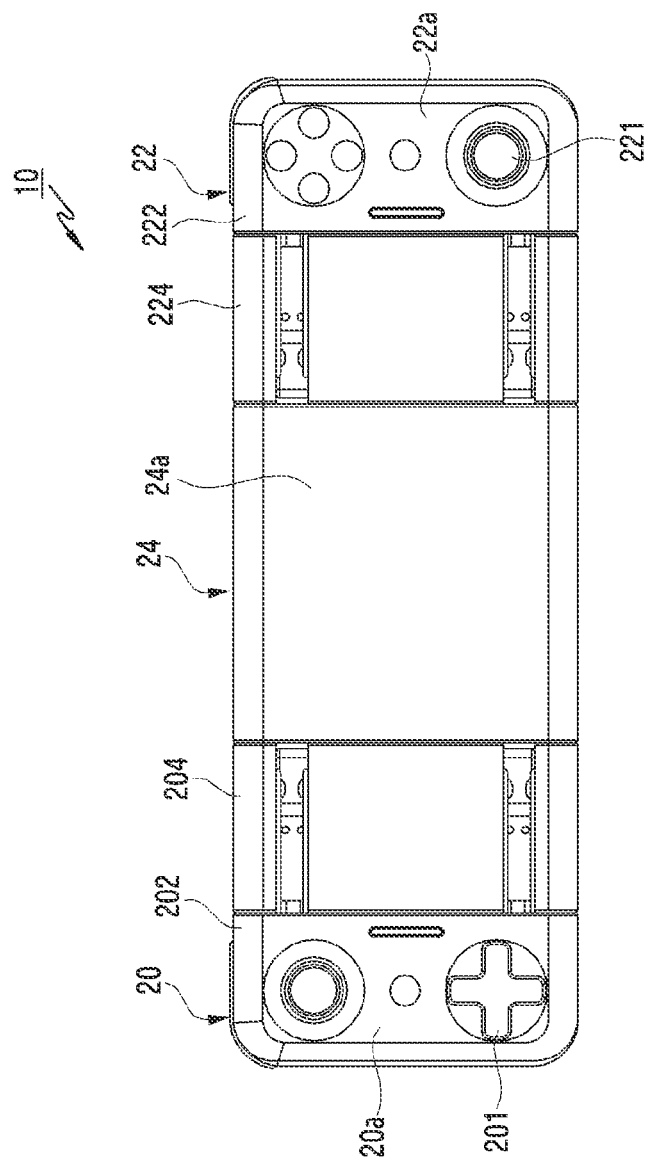
FIG. 4A is a plan view illustrating a key operating device in an closed state according to various embodiments of the disclosure.
Figure 4B:
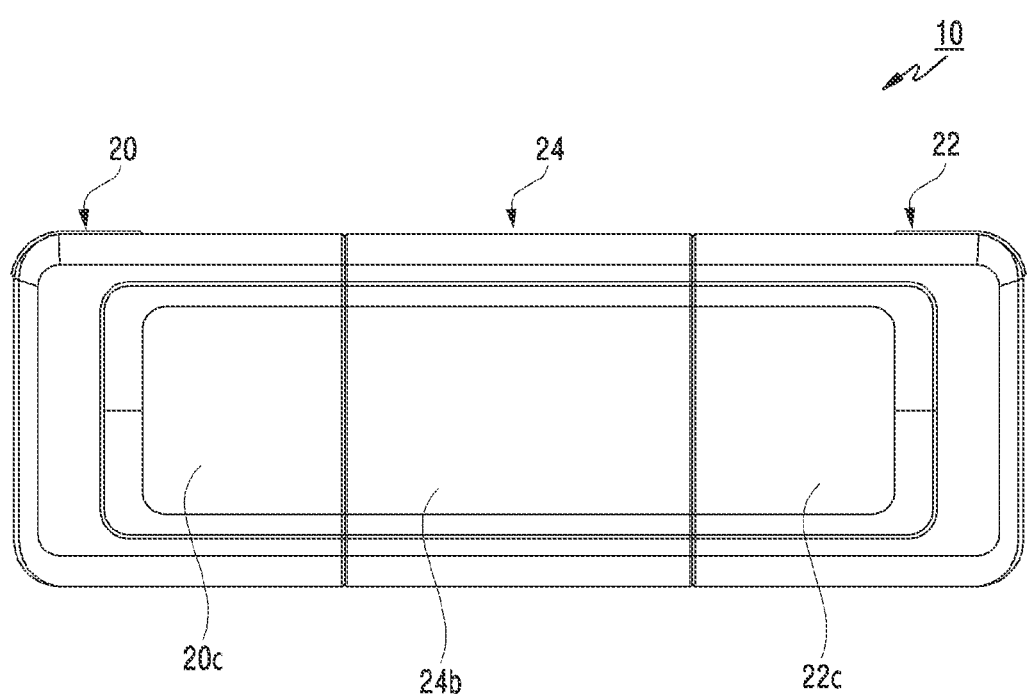
FIG. 4B is a bottom view illustrating a key operating device in an closed state according to various embodiments of the disclosure.
Figure 4C:
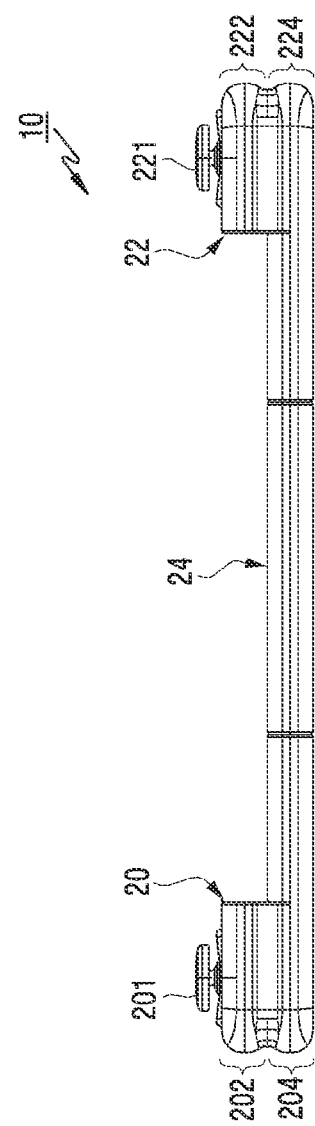
FIG. 4C is a front view illustrating a key operating device in an closed state according to various embodiments of the disclosure.

FIG. 2A is a plan view illustrating a key operating device in a closed state according to various embodiments of the disclosure. FIG. 2B is a bottom view illustrating a key operating device in a closed state according to various embodiments of the disclosure. FIG. 2C is a front view illustrating a key operating device in a closed state according to various embodiments of the disclosure. FIG. 2D is one side view illustrating a key operating device in a closed state according to various embodiments of the disclosure. FIG. 3 is a perspective view illustrating a key operating device in an open state according to various embodiments of the disclosure. FIG. 4A is a plan view illustrating a key operating device in an open state according to various embodiments of the disclosure. FIG. 4B is a bottom view illustrating a key operating device in an open state according to various embodiments of the disclosure. FIG. 4C is a front view illustrating a key operating device in an open state according to various embodiments of the disclosure.

Referring to FIG. 2A to FIG. 4D, the first operating portion 20 according to various embodiments may be referred to as a first controller, a first data input portion, or a first keypad portion. The first operating portion 20 according to various embodiments may include a first face 20a facing in a first direction ① and a second face 20c facing in a second direction ② opposite to the first direction ①. At least one or more keys 201 and at least one speaker hole 203 may be disposed on the first face 20a of the first operating portion 20. In particular, the keys 201 required for a game and the speaker hole 203 for outputting sound related to the game may be disposed thereon. For example, the key required for the game may include a 4-direction key, a stick, or the like. The at least one speaker hole 203 may be utilized as a heat dissipation hole for discharging heat generated inside the first operating portion 20 to the outside.

The seating portion 24 according to various embodiments may be disposed between the first and second operating portions 20 and 22 in an overlapping manner while maintaining a state of being parallel with each of the first and second operating portion 20 and 22, and may be disposed between the first and second operating portions 20 and 22 in a parallel manner by moving downward depending on a sliding movement of the first and second operating portions 20 and 22. The sliding of the seating portion 24 and a downward movement after the sliding movement may be managed by a connecting device (e.g., the connecting device 30 of FIG. 6). In addition, the seating portion 24 may be configured such that, when it overlaps with each of the first and second operating portions 20 and 22, the downward movement is restricted and, when it is no longer in a state of overlapping with each of the first and second operating portions 20 and 22 (in a non-overlapping state), the downward movement is possible since a rotation operation is enabled by means of the connecting device (e.g., the connecting device 30 of FIG. 6).

The first operating portion 20 according to various embodiments may include a first support 204 and a first key input portion 202 constructed at the first support 204 in the first direction ①. The first support 204 may be disposed to a lower portion of the first operating portion 20, and the first key input portion 202 may be disposed to an upper portion of the first support 204. For example, the first operating portion 20 may have a substantially right-angle or stepped cross-section. The first face 20a may be referred to as an upper face, a first cover, or a first plate. The second face 20c may be referred to as a lower face, a second cover, or a second plate.

The second operating portion 22 according to various embodiments may be referred to as a second controller, a second data input portion, or a second key pad portion. The second operating portion 22 according to various embodiments may be disposed to face the first operating portion 20, and may be symmetrical about the seating portion 24. The second operation portion 22 may include a third face 22a facing in the first direction ① and a fourth face 22c facing in a second direction ② opposite to the first direction ①, and may be coupled to be movable in a sliding manner in a direction being close to or away from the first operating portion 20 while maintaining a state of being parallel with the first operation portion 20.

At least one key 221 and at least one speaker hole 223 may be disposed on the third face 22c of the second operating portion 22. In particular, keys required for a game and speaker holes outputting sound related to the game may be disposed thereon. For example, the key required for the game may include a 4-direction key, a stick, or the like. The at least one speaker hole 223 may be utilized as a heat dissipation hole for discharging heat generated inside the second operating portion 22 to the outside.

The second operating portion 22 according to various embodiments may include a second support 224 and a second key input portion 222 constructed at the second support 224 in the first direction ①. The second support 224 may be disposed to a lower portion of the second operating portion 22, and the second key input portion 222 may be disposed to an upper portion of the second support 224. For example, the second operating portion 22 may have a substantially right-angle or stepped cross-section. The third face 22a may be referred to as an upper face, a third cover, or a third plate. The fourth face 22c may be referred to as a lower face, a fourth cover, or a fourth plate.

Figure 15A:
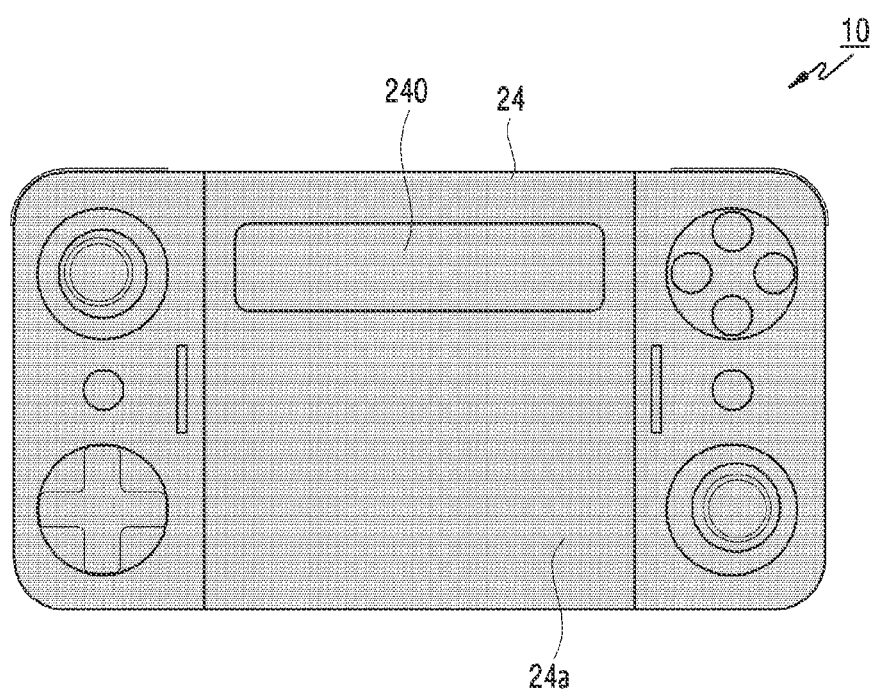
FIG. 15A is a perspective view illustrating a key operating device in a closed state where a display is disposed to a seating portion according to various embodiments of the disclosure.

The seating portion 24 according to various embodiments may function as a support of the electronic device when in an open state, and may function as an auxiliary display when in a closed state (e.g., FIG. 15A). The searing portion 24 according to various embodiments may include an outer face 24a facing in the first direction ① and an inner face 24b facing in the second direction ②. The seating portion 24 may be disposed to be parallel with the first and second operating portions 20 and 22 in a state of being accommodated between the first and second operating portion 20 and 22. The seating portion 24 may move downward, i.e., in the second direction ②, while maintaining a state of being parallel depending on a sliding movement of the first and second operating portions 20 and 24. Such a downward movement of the seating portion may be performed by means of a connecting device.

When the first and second operating portions 20 and 22 continuously move in directions being away from each other, the seating portion 24 may move in the second direction ② and thus be disposed between the first and second operating portions 20 and 22. Therefore, the electronic device is mountable to a space prepared on the first and second seating portions 20 and 22 and the seating portion 24. When the first and second operating portions 20 and 22 move in directions being close to each other, the seating portion 24 may move in the first direction ① and thus be disposed between the first and second operating portions 20 and 22 and the seating portion 24.

When in the open state, the seating portion 24 may be disposed between the first and second supports 204 and 224 so as to be parallel, without overlapping, with each of the first and second supports 204 and 224. When in the closed state, the seating portion 24 may be disposed between the first and second pad portions 202 and 222 so as to be parallel, without overlapping, with the first and second key pad portions 202 and 222. In addition, when in the closed state, the seating portion may be disposed between the first and second key pad portions 202 and 222 so as to be parallel in a state of overlapping with the first and second supports 204 and 224.

Each of the first and second key input portions 202 and 222 according to various embodiments may be configured to have substantially the same thickness as the seating portion 24, and each of the first and second supports 204 and 224 may be configured to have substantially the same thickness as the seating portion 24. In a state where the key operating device 10 is open, an upper face of the first and second supports 204 and 224 and the outer face 24a of the seating portion may be disposed in a coplanar state, and the electronic device may be mounted to a space prepared by the first and second operating portions 20 and 22 and the seating portion 24.

Figure 5:
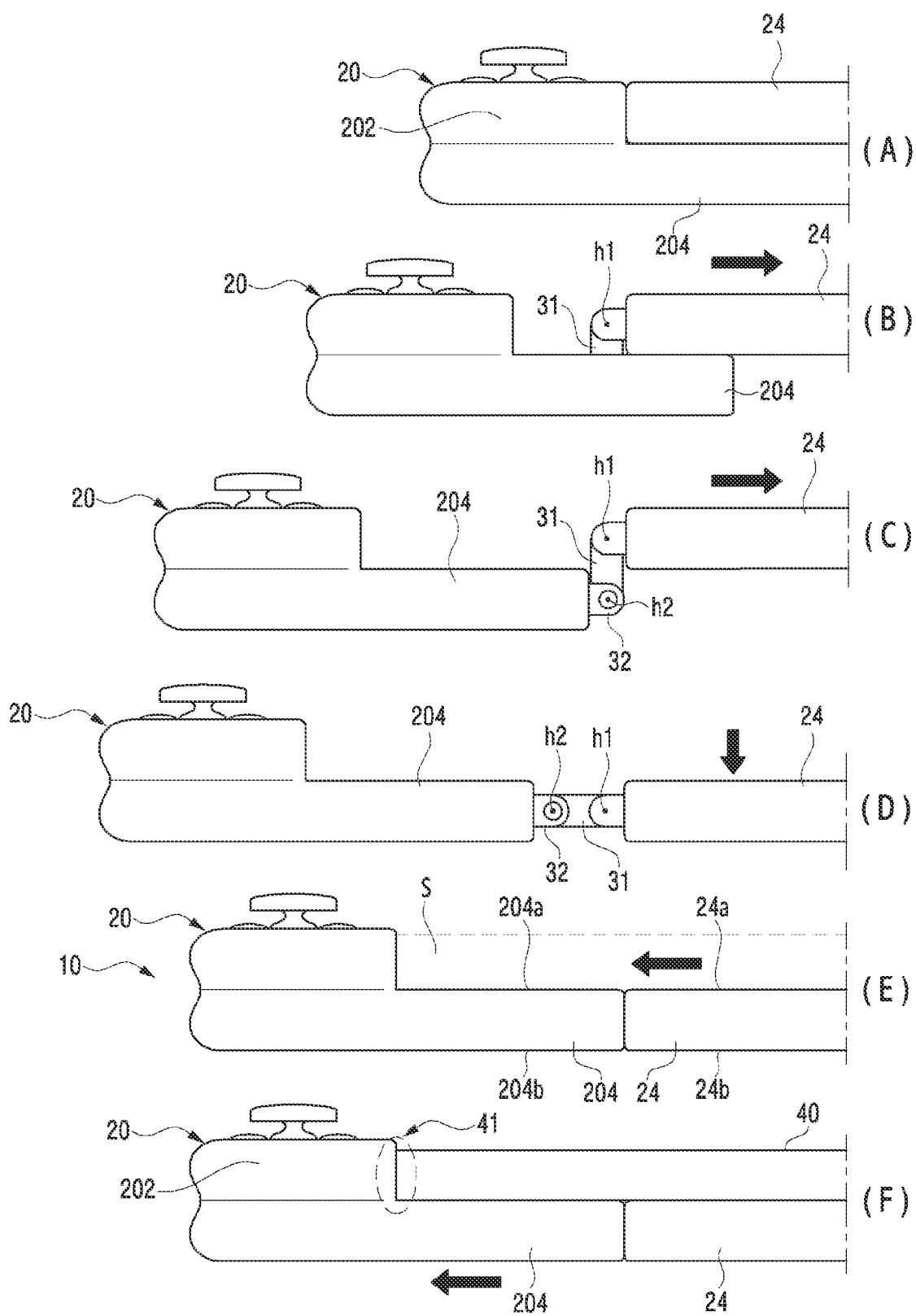
FIG. 5 is a front view partially illustrating, step-by-step, a state where a key operating device switches from a closed state to an open state according to various embodiments of the disclosure.

FIG. 5 is a front view partially illustrating, step-by-step, a state where a key operating device switches from a closed state to an open state according to various embodiments of the disclosure.

Hereinafter, an operation in which a key operating device switches from a closed state to an open state according to various embodiments will be described step-by-step as follows with reference to FIG. 5. For example, since the key operating device 10 has a structure and operation symmetrical to the left (an operation of the first operating portion 20) and the right (an operation of the second operating portion 22), an operation of the left side, i.e., the first operating portion 20, will be descried for example, and descriptions on an operation of the second operating portion will be omitted.

FIG. 5(a) may be the key operating device 10 in the closed state. When in the closed state, the seating portion 24 may be disposed to be parallel, without overlapping, with the first key input portion 202, and may be disposed to be parallel and overlapping with the first support 204.

FIG. 5(b) may be a state where the first operating portion 20 is slid from the seating portion 24 by a first distance. In this case, a first hinge axis h1 and a first hinge member 31 may be disposed to be exposed by deviating from the first operating portion 20. The seating portion 24 and the first support 204 may be in an overlapping state when viewed vertically from above, and may be in a state of being parallel and facing each other. Since the seating portion 24 and the first support 204 face each other, it may be a state where the first hinge axis h1 cannot provide a rotation operation.

FIG. 5(c) may be a state where the first operating portion 20 is slid from the seating portion 24 by a second distance. In this state, the first hinge axis 1 and the first hinge member 31 may be in a state of deviating from the first support 204. The seating portion 24 and the first support 204 may be in a non-overlapping state when viewed vertically from above. Since each of the first and second hinge axes h1 and h2 is in a state of capable of providing a rotation operation, the seating portion 24 may rotate about each of the first and second hinge axes h1 and h2. When the seating portion 24 is viewed vertically from above, the first and second hinge axes h1 and h2 may be in an overlapping state.

FIG. 5(d) may be a state where the seating portion 24 moves downward. The seating portion 24 may move downward by rotating about each of the first and second hinge axes h1 and h2. In this case, the seating portion 24 and the first support 204 may be in a state of being parallel, without overlapping, when viewed vertically from above. When the seating portion 24 is viewed vertically from above, each of the first and second hinge axes h1 and h2 may be in a state of being spaced apart, without overlapping, from each other.

FIG. 5(d) may be the key operating device 10 in the open state. FIG. 5(e) may be a state where the seating portion 24 moves to the first operating portion 20 by a third distance in a sliding manner. The seating portion 24 which moves downward may be coupled with the first operating portion 20 due to the sliding movement. The first hinge member 31, a first sliding hinge member 32, and the first and second hinge axes h1 and h2 may be disposed to be hidden by being accommodated inside the first operating portion 20. In this state, the first support 204 and the seating portion 24 may be disposed to be parallel, without overlapping, with each other, when viewed vertically from above, and may be disposed in a straight line. In addition, an upper face 204a of the first support 204 and the outer face 24a of the seating portion 24 may be disposed in a coplanar state, and a lower face 204b of the first support 204 and the inner face 24b of the seating portion 24 may be disposed mutually in the coplanar state. In this state, a space surrounded by the seating portion 24, the first support 204, and the first key input portion 202 may be prepared.

FIG. 5(f) may be a state where the electronic device 40 is mounted to the space surrounded by the seating portion 24, the first support 204, and the first key input portion 202. The mounted electronic device 40 may be disposed to overlap with the first support 204 and the seating portion 24, and may be disposed not to overlap with the first key input portion 202. One end portion of the electronic device 40 may be coupled with the first key input portion 202 to provide a first holding structure 41. To detach the mounted electronic device 40, a user may pull the first operating portion 20 in an outward direction (a direction being away from the second operating portion 22) and thereafter may detach the mounted electronic device 40.

FIG. 6 is a front view illustrating each of first and second connecting devices mounted to a key operating device in a closed state according to various embodiments of the disclosure.

Referring to FIG. 6, a key operating device (e.g., the key operating device 10 of FIG. 1) according to various embodiments may include the connecting device 30 which physically connects first and second operating portions (e.g., the first and second operating portions 20 and 22 of FIG. 1) and a seating portion (e.g., the seating portion 24 of FIG. 1).

For example, the connecting device 30 may include a first connecting device 301 which connects the first operating portion 20 and one end of the seating portion 24, and a second connecting device 303 which connects the first operating portion 20 and the other end of the seating portion 24. The first connecting device 301 may be accommodated in the first operating portion 20, and the second connecting device 303 may be accommodated in the second operating portion. In addition, the first connecting device 301 may be movable in a sliding manner in the first operating portion by means of a guide rail (not shown), and the second connecting device 303 may be movable in a sliding manner in the second operating portion by means of a guide rail (not shown).

Each of the first and second connecting devices 301 and 303 may be disposed to be symmetrical about the seating portion 24. One end of each of the first hinge members 31 and 33 and one end of the seating portion 24 may be coupled to provide the first hinge axis h1, and the other end of each of the first hinge members 31 and 33 and one end of each of the first sliding hinge members 32 and 34 may be coupled to provide the second hinge axis h2.

Figure 7A:
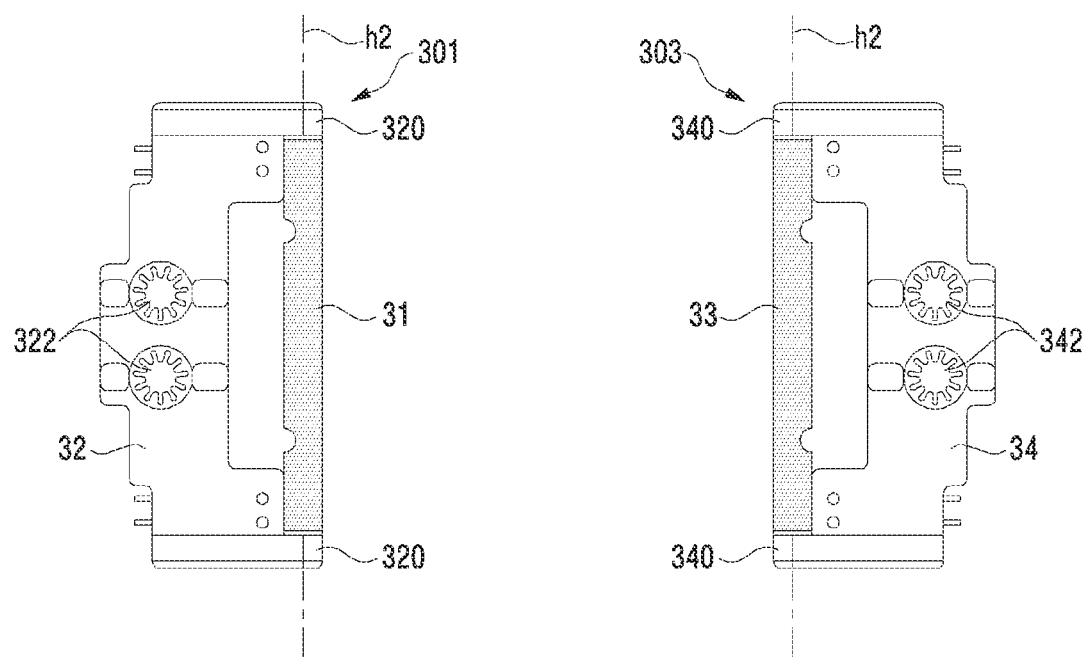
FIG. 7A is a bottom view illustrating each of first and second connecting devices mounted on a key operating device in a closed state according to various embodiments of the disclosure.
Figure 7B:
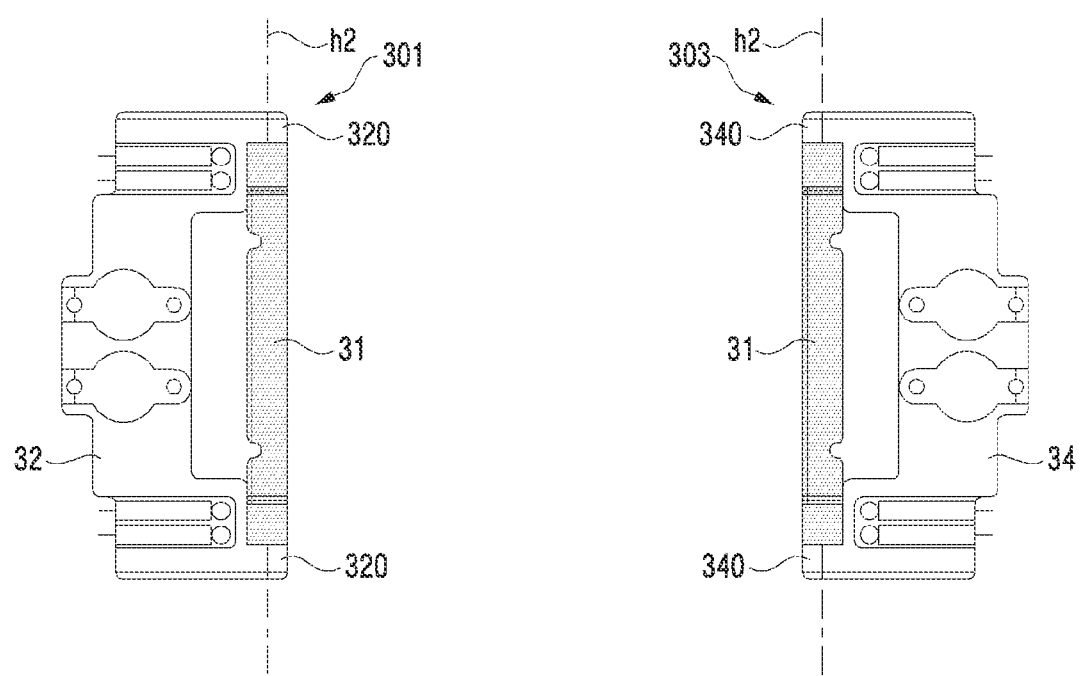
FIG. 7B is a plan view illustrating each of first and second connecting devices mounted on a key operating device in a closed state according to various embodiments of the disclosure.

FIG. 7A is a bottom view illustrating each of first and second connecting devices mounted on a key operating device in a closed state according to various embodiments of the disclosure. FIG. 7B is a plan view illustrating each of first and second connecting devices mounted on a key operating device in a closed state according to various embodiments of the disclosure.

Referring to FIG. 7A and FIG. 7B, a first sliding hinge member of a first connecting device according to various embodiments may include one pair of first hinge arms to be coupled with the first hinge member 31. The first sliding hinge member 32 may include one pair of second hinge arms to be coupled with the second hinge member 33.

The key operating device according to various embodiments may include each of first and second reduction portions to smoothen the sliding movement of the first and second sliding hinge members. The first reduction portion may be disposed to the first operating portion 20, and the second reduction portion may be disposed to the second operating portion 22. The first reduction portion according to various embodiments may include a first reduction gear 322 and a first rack gear 324. The second reduction portion may include a second reduction gear 342 and a second rack gear 344.

The first sliding hinge member 32 according to various embodiments may include one pair of first reduction gears 322 at a bottom face. The first reduction gears 322 may be spaced apart from each other, and may be disposed to be vertically symmetrical. The first sliding hinge member 32 according to various embodiments may include one pair of second reduction gears at the bottom face. The second reduction gears 342 may be spaced apart from each other, and may be disposed to be vertically symmetrical. The first rack gear 324 may be disposed to be engaged between the pair of first reduction gears 322, and the second rack gear 344 may be disposed to be engaged between the pair of second reduction gears 342.

Figure 8:
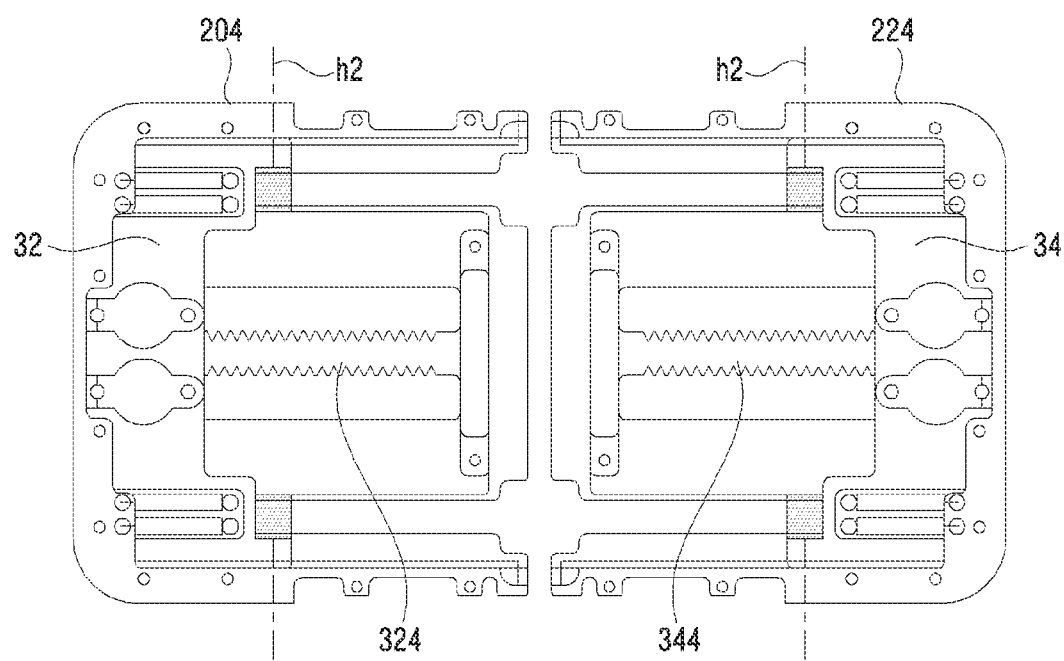
FIG. 8 is a plan view illustrating a mounting state of each of first and second connecting devices mounted on a key operating device in a closed state according to various embodiments of the disclosure.

FIG. 8 is a plan view illustrating a mounting state of each of first and second connecting devices mounted on a key operating device in a closed state according to various embodiments of the disclosure.

Referring to FIG. 8, the first support 204 of the first connecting device according to various embodiments may include the first rack gear 324. The first rack gear 324 may extend linearly and thus be disposed to be engaged with each of the first reduction gears 322 (e.g., the first reduction gears 322 of FIG. 7A). Therefore, the first reduction gear 322 may perform an operation of being engaged with the first rack gear 324 according to a sliding movement of the first sliding hinge member 32.

The second support 224 of the second connecting device according to various embodiments may include the second rack gear 344. The second rack gear 344 may extend linearly and thus be disposed to be engaged with each of the second reduction gears 342 (e.g., the second reduction gears 342 of FIG. 7A). Therefore, the second reduction gear 342 may perform an operation of being engaged with the second rack gear 344 according to a sliding movement of the second sliding hinge member 34.

Figure 9:
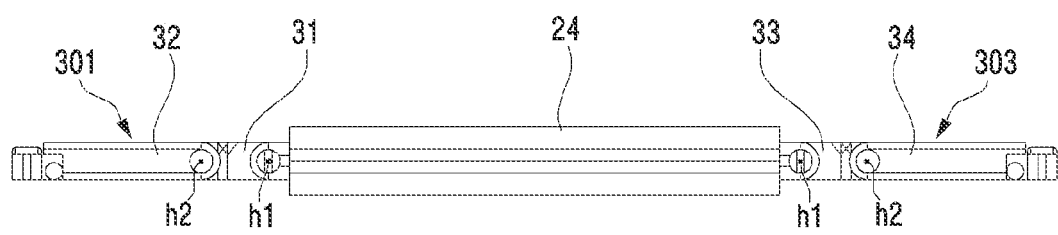
FIG. 9 is a front view illustrating each of first and second connecting devices mounted on a key operating device in an open state according to various embodiments of the disclosure.
Figure 10A:
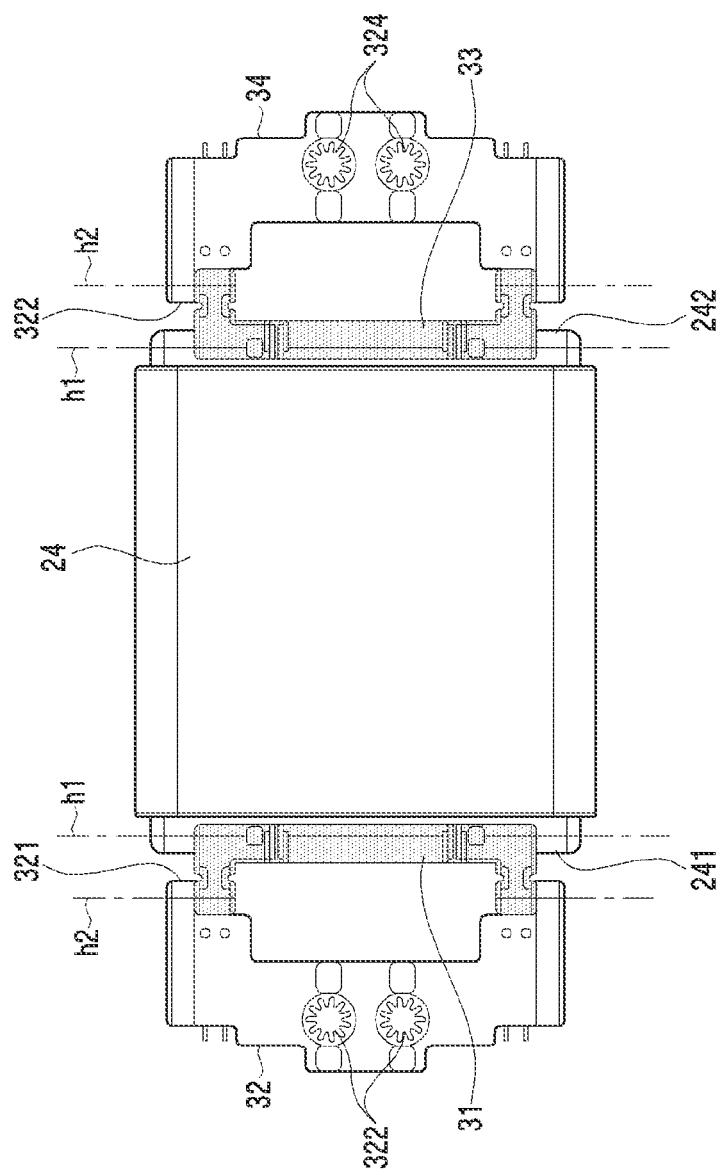
FIG. 10A is a bottom view illustrating each of first and second connecting devices mounted on a key operating device in a closed state according to various embodiments of the disclosure.
Figure 10B:
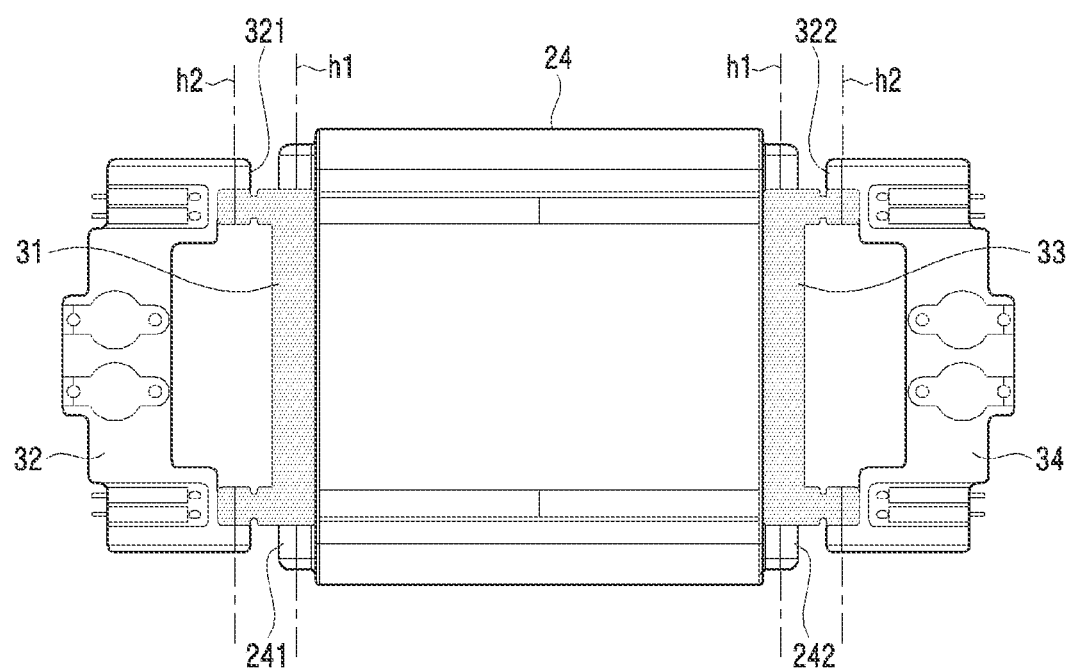
FIG. 10B is a plan view illustrating each of first and second connecting devices mounted on a key operating device in a closed state according to various embodiments of the disclosure.

FIG. 9 to FIG. 11 illustrate each of first and second sliding hinge members of a key operating device in an open state and an arrangement state of the first and second hinge members.

FIG. 9 is a front view illustrating each of first and second connecting devices mounted on a key operating device in an open state according to various embodiments of the disclosure.

Referring to FIG. 9, each of the first and second connecting devices 301 and 303 according to various embodiments may be disposed in a straight line, without overlapping with the seating portion 24, when in an open state. The first sliding hinge member 32 and the first hinge member 31 may be disposed in a straight line, without overlapping with the seating portion 24. The second sliding hinge member 34 and the second hinge member 33 may be disposed in a straight line, without overlapping with the seating portion 24. Each of the first and second hinge axes h1 and h2 may be disposed at a position not overlapping with the seating portion 24, in a state of being spaced apart from each other, when viewed vertically from above.

FIG. 10A is a bottom view illustrating each of first and second connecting devices mounted on a key operating device in a closed state according to various embodiments of the disclosure. FIG. 1013 is a plan view illustrating each of first and second connecting devices mounted on a key operating device in a closed state according to various embodiments of the disclosure. FIG. 11 is a plan view illustrating a mounting state of each of first and second connecting devices mounted on a key operating device in a closed state according to various embodiments of the disclosure.

Referring to FIG. 10A to FIG. 11, one end of the first hinge member 31 may be coupled with a hinge arm 241 disposed to one end of the seating portion 24 to provide the first hinge axis h1, and the other end of the first hinge member 31 may be coupled with a hinge arm 321 disposed to one end of the first sliding hinge member 32 to provide the second hinge axis h2.

One end of the second hinge member 33 may be coupled with a hinge arm 242 disposed to one end of the seating portion 24 to provide the first hinge axis h1, and the other end of the second hinge member 33 may be coupled with a hinge arm 322 disposed to one end of the first sliding hinge member 34 to provide the second hinge axis h2. The first sliding hinge member 32 may perform a sliding movement on a first support (e.g., the first support 204 of FIG. 2C), and the second sliding hinge member 34 may perform a sliding movement on a second support (e.g., the second support 224 of FIG. 2C). The first sliding hinge member 32 may be slid in a state where the first reduction gear 322 is engaged with a first rack gear (e.g., the first rack gear 324 of FIG. 8) disposed on the first support, and the first sliding hinge member 34 may be slid in a state where the second reduction gear 342 is engaged with a second rack gear (e.g., the second rack gear 344 of FIG. 2) disposed on the second support 224.

Figure 12A:
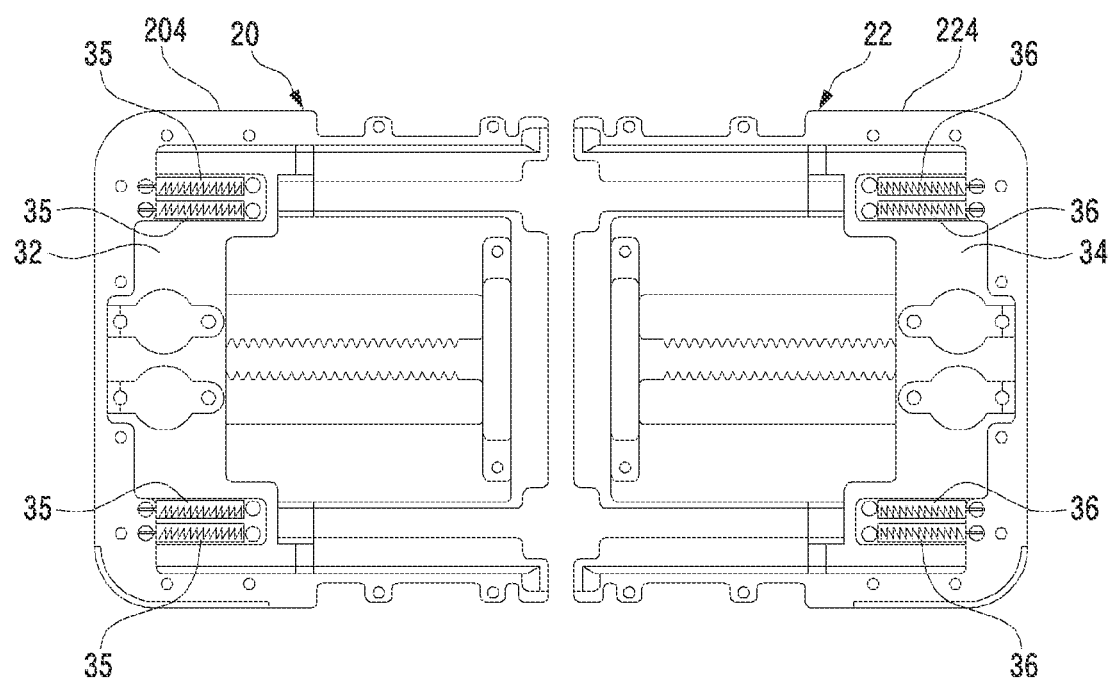
FIG. 12A is a plan view illustrating a mounting state of first and second coil tension springs mounted on a key operating device in a closed state according to various embodiments of the disclosure.
Figure 12B:
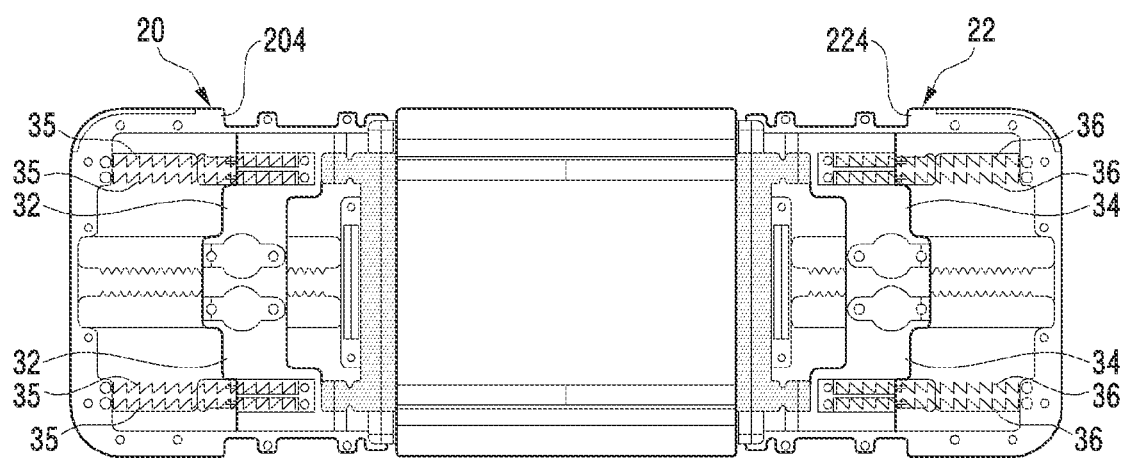
FIG. 12B is a plan view illustrating a state of first and second tension coil springs mounted on a key operating device in an open state according to various embodiments of the disclosure.

FIG. 12A is a plan view illustrating a mounting state of first and second coil tension springs mounted on a key operating device in a closed state according to various embodiments of the disclosure. FIG. 12B is a plan view illustrating a state of first and second tension coil springs mounted on a key operating device in an open state according to various embodiments of the disclosure.

Referring to FIG. 12A and FIG. 12B, each of the first and second operating portions 20 and 22 according to various embodiments may use at least one elastic body to provide force for allowing it to be coupled in a direction of the seating portion 24. For example, the at least one elastic body may include first and second tension coil springs 35 and 36. The first tension coil spring 35 may be constructed of at least one pair of tension coil springs, and the second tension coil spring 36 may be constructed of at least one pair of tension coil springs. The first and second coil springs 35 and 36 may be disposed to be symmetrical to each other about the seating portion 24, or may face each other.

The first tension coil spring 35 according to various embodiments may be disposed between the first support 204 and the first sliding hinge member 32, and the second tension coil spring 36 may be disposed between the second support 224 and the second sliding hinge member 34. One end of the first tension coil spring 35 may be fixed to the first support 204, and the other end thereof may be fixed to the first sliding hinge member 32. One end of the second tension coil spring 35 may be fixed to the second support 224, and the other end thereof may be fixed to the second sliding hinge member 34.

The first sliding hinge member 32 may be provided with restoration force in a direction being away from the seating portion 24 by means of the first tension coil spring 35, and the second sliding hinge member 35 may be provided with restoration force in a direction being away from the seating portion 24 by means of the second tension coil spring 36. In addition, the first operating portion 20 may be provided with force for allowing it to be close to the seating portion 24 by means of the first tension coil spring 35, and the second operating portion 22 may be provided with force for allowing it to be close to the seating portion 24 by means of the second tension coil spring 36.

Figure 13B:
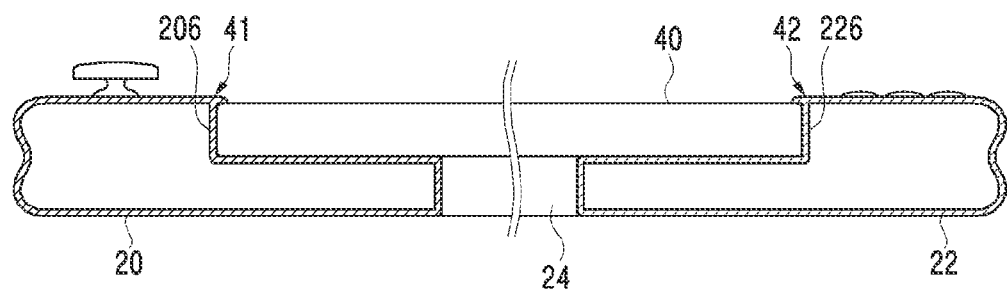
FIG. 13B is a cross-sectional view of FIG. 13A.

FIG. 13A is a perspective view illustrating a state where an electronic device is mounted on a key operating device according to various embodiments of the disclosure, and FIG. 13B is a cross-sectional view thereof.

Referring to FIG. 13A and FIG. 13B, the key operating device according to various embodiments may mount the electronic device 40 when in an open state. In the key operating device in the open state, the first and second operating portions 20 and 22 may be pulled in directions being away from each other, and thereafter the electronic device 40 may be disposed to a space prepared by the first and second operating portions 20 and 22 and the seating portion 24. When the pulling force is removed, the mounted electronic device 40 may be coupled with the first and second operating portions 20 and 22 by restoration force of the first and second operating portions 20 and 22.

Both ends of the electronic device 40 may be coupled respectively with a first recess 206 disposed to a side face of the first operating portion 20 and a second recess 226 disposed to a side face of the second operating portion 22. The first recess 206 and one end of the electronic device 40 may provide the first holding structure 41, and the second recess 226 and the other end of the electronic device 40 may provide a second holding structure 42.

Figure 14A:
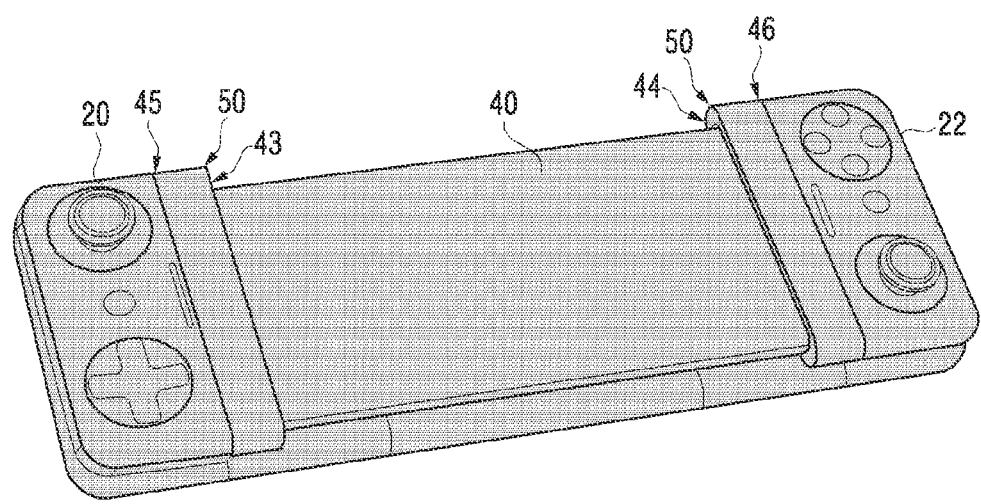
FIG. 14A is a perspective view illustrating a state where an electronic device having a different size is mounted on a key operating device by using an adaptor according to various embodiments of the disclosure.
Figure 14B:
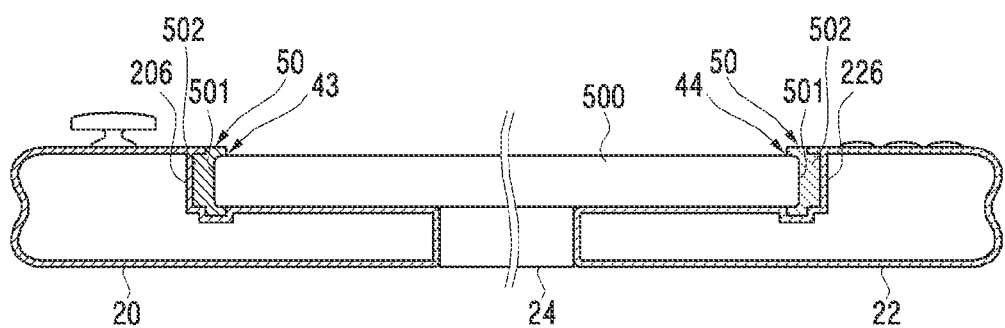
FIG. 14B is a cross-sectional view of FIG. 14A.

FIG. 14A is a perspective view illustrating a state where an electronic device having a different size is mounted on a key operating device by using an adaptor according to various embodiments of the disclosure, and FIG. 14B is a cross-sectional view thereof.

Referring to FIG. 14A and FIG. 14B, the key operating device according to various embodiments may mount an electronic device 500 having a different size when in an open state. In the key operating device in the open state, the first and second operating portions 20 and 22 may be pulled in directions being away from each other, and thereafter an adaptor 50 coupled with the electronic device 500 may be disposed to a space prepared by the first and second operating portions 20 and 22 and the seating portion 24. When the pulling force is removed, the mounted adaptor 50 may be coupled with the first and second operating portions 20 and 22 by restoration force of the first and second operating portions 20 and 22.

Both ends of the electronic device 500 may be coupled with first and second adaptor recesses 501 of the respective adaptors. Both ends of the adaptor 50 may be respectively coupled with the first recess 206 disposed on a side face of the first operating portion 20 and the second recess 226 disposed on a side face of the second operating portion 22. For example, the adaptor 50 may have first and second protrusions 502 disposed on an outer face and the first and second adaptor recesses 501 disposed on an inner face. The first and second adaptor recesses 501 and the both ends of the electronic device 500 may be coupled to provide third and fourth holding structures 43 and 44, and the first and second protrusions 502 and the first and second recesses 206 and 226 may be coupled to provide fifth and sixth holding structures 45 and 46.

Figure 15B:
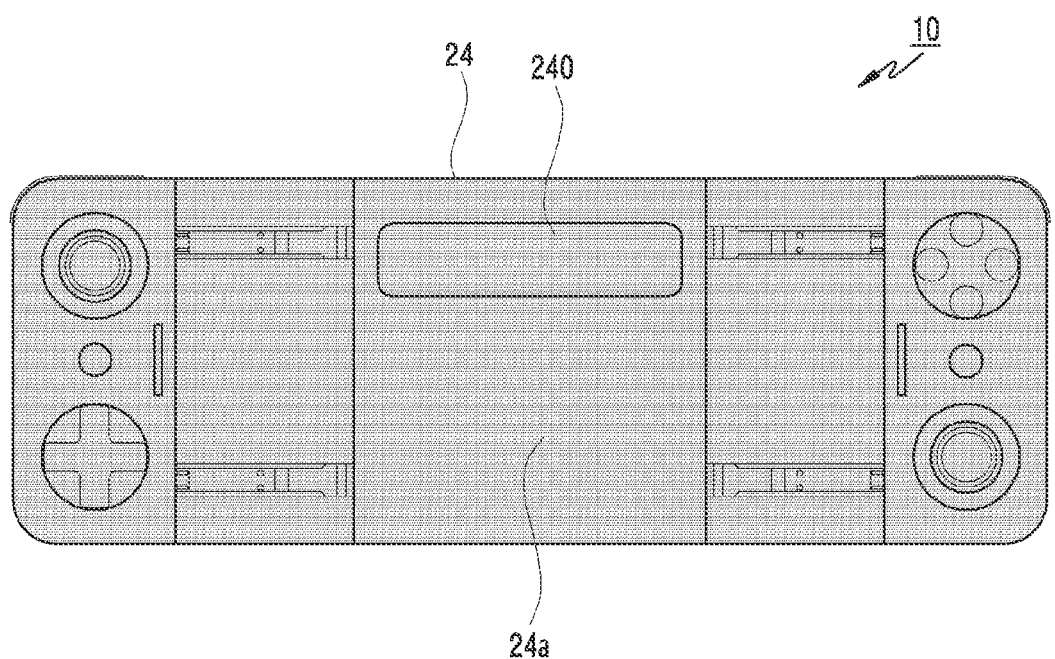
FIG. 15B is a perspective view illustrating a key operating device in an open state where a display is disposed to a seating portion according to various embodiments of the disclosure.

FIG. 15A is a perspective view illustrating a key operating device in a closed state where a display is disposed to a seating portion according to various embodiments of the disclosure. FIG. 15B is a perspective view illustrating a key operating device in an open state where a display is disposed to a seating portion according to various embodiments of the disclosure.

Referring to FIG. 15A and FIG. 15B, the key operating device 10 according to various embodiments may have at least one display 240 disposed to at least part of the upper face 24a of the seating portion 24. For example, a notification, an alarm, or the like which occurs during a game may be disposed to the display 240. The display 240 may be disposed on the entirety of the upper face 24a of the seating portion.

Figure 16:
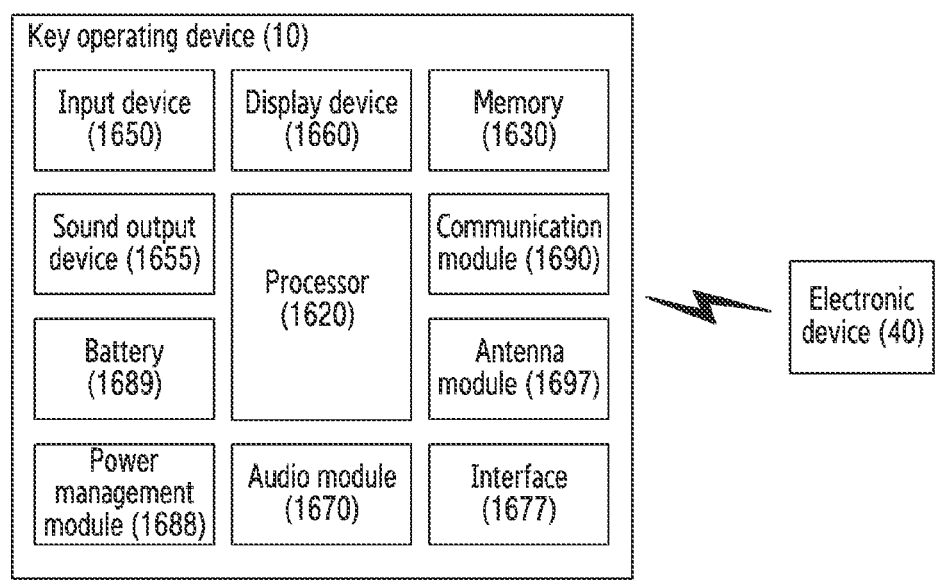
FIG. 16 is a block diagram illustrating a key operating device according to various embodiments.

FIG. 16 is a block diagram illustrating a key operating device according to various embodiments.

Referring to FIG. 16, the key operating device 10 may communicate with the electronic device 40 through a wireless network (e.g., a short-range wireless communication network). According to an embodiment, the key operating device 10 may include at least any one of a processor 1620, a memory 1630, an input device 1650, a sound output device 1655, a display device 1660, an audio module 1670, an interface 1677, a power management module 1688, a battery 1689, a communication module 1690, and an antenna module 1697. In some embodiments, at least one the display device 1660) of the components may be omitted from the key operating device 10, or one or more other components may be added. In some embodiments, some of the components may be implemented as single integrated circuitry.

The processor 1620 may execute, for example, software to control at least one other component (e.g., a hardware or software component) of the key operating device 10 coupled with the processor 1620, and may perform various data processing or computation. According to one embodiment, as at least part of the data processing or computation, the processor 1620 may load a command or data received from another component (e.g., the communication module 1690) in the memory 1630, process the command or the data stored in the memory 1630, and store resulting data in the memory 1630.

The memory 1630 may store various data used by at least one component (e.g., the processor 1620) of the key operating device 10. The data may include, for example, software and input data or output data for a command related thereto.

The input device 1650 may receive a command or data to be used by other component (e.g., the processor 1620) of the key operating device 10, from the outside (e.g., a user) of the key operating device 10. According to various embodiments, the input device 1650 may include the first and second operating portions 20 and 22.

The sound output device 1655 may output sound signals to the outside of the key operating device 10. The sound output device 1655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1660 may visually provide information to the outside (e.g., a user) of the electronic device 10. The display device 1660 may include, for example, a display, a hologram device, or a projector and control circuitry to control a corresponding device. According to an embodiment, the display device 1660 may include touch circuitry adapted to detect a touch, or sensor circuitry (e.g., a pressure sensor) adapted to measure the intensity of force incurred by the touch.

The audio module 1670 may convert a sound into an electrical and vice versa. The sound may be output through the sound output device 1655.

The interface 1677 may support one or more specified protocols that can be used for the key operating device 10 to be wirelessly coupled with the electronic device 40.

The power management module 1688 may manage power supplied to the key operating device 10. According to an embodiment, the power management module 1688 may be implemented as at least part of, for example, a Power Management Integrated Circuit (PMIC).

The battery 1689 may supply power to at least one component of the key operating device 10. According to an embodiment, the battery 1689 may include, for example, a primary cell which is not rechargeable, a secondary cell which is rechargeable, or a fuel cell.

The communication module 1690 may support establishing a wireless communication channel between the key operating device 10 and the electronic device 40 and performing communication through the established communication channel. The communication module 1690 may include one or more communication processors that are operable independently from the processor 1620 and support wireless communication. According to an embodiment, the communication module 1690 may include a wireless communication module 1692 (e.g., a short-range wireless communication module). For example, the communication module 1690 may communicate with the electronic device 40 through the short-range wireless communication network such as Bluetooth.

The antenna module 1697 may transmit a signal or power to or from the outside (e.g., the electronic device 40). According to an embodiment, the antenna module 1697 may include one or more antennas, and may be selected, for example, by the communication module 1690. The signal or power may be transmitted or received between the communication module 1690 and the electronic device 40 through the selected at least one antenna.

According to various embodiments, the key operating device 10 may wirelessly communicate with the electronic device 40. To this end, the key operating device 10 may be wirelessly connected to the electronic device 40. The key operating device 10 may be connected through a wireless network. For example, the key operating device 10 and the electronic device 40 may be connected through a short-range wireless communication network such as Bluetooth. The key operating device 10 may transmit the key signal to the electronic device 40, based on at least one key input generated through the first and second operating portions 20 and 22. Accordingly, during the electronic device 40 executes the game application, the electronic device 40 may control the game application, based on the key signal. According to an embodiment, the key operating device 10 may output an audio signal received from the electronic device 40. Accordingly, during the electronic device 40 executes the game application, the key operating device 10 may output the audio signal related to the game application. According to another embodiment, the key operating device 10 may output an event received from the electronic device 40. Accordingly, during the electronic device 40 executes the game application, the key operating device 10 may output the event occurring in the electronic device 40.

Figure 17:
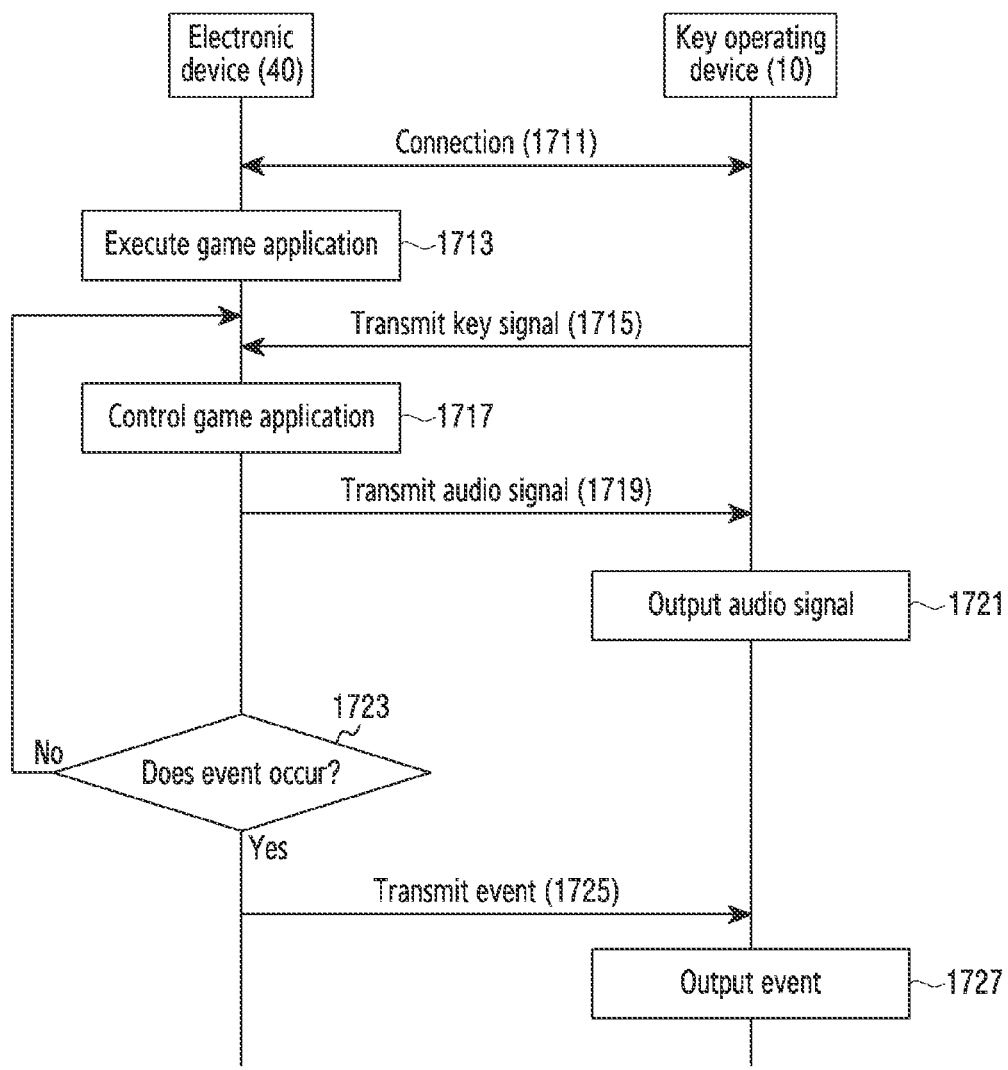
FIG. 17 is a flowchart illustrating a signal flow between a key operating device and an electronic device according to various embodiments.

FIG. 17 is a flowchart illustrating a signal flow between a key operating device and an electronic device according to various embodiments.

Referring to FIG. 17, in operation 1711, the key operating device 10 and the electronic device 40 may be connected wirelessly. The key operating device 10 and the electronic device 40 may be connected through a wireless network. For example, the key operating device 10 and the electronic device 40 may be connected through a short-range wireless communication network such as Bluetooth. To this end, the key operating device 10 may be pre-registered to the electronic device 40. Accordingly, when the key operating device 10 is turned on, the key operating device 10 and the electronic device 40 may be connected wirelessly. According to an embodiment, the electronic device 40 may be mounted on the key operating device 10. For example, the electronic device 40 may be mounted to a space prepared by the first and second operating portions 20 and 22 and the seating portion 24 in the key operating device 10. According to another embodiment, the electronic device 40 may be spaced apart, without being mounted on the key operating device 10.

In operation 1713, the electronic device 40 may execute a game application. During the electronic device 40 executes the game application, in operation 1715, the key operating device 10 may transmit at least one key signal to the electronic device 40. For example, the key operating device 10 may transmit the key signal to the electronic device 40, based on at least one key input generated through the first and second operating portions 20 and 22. Upon receiving the key signal from the key operating device 10, in operation 1717, the electronic device 40 may control the game application, based on the key signal. In operation 1719, the electronic device 40 may transmit an audio signal related to the game application to the key operating device 10. Upon receiving the audio signal from the electronic device 40, in operation 1721, the key operating device 10 may output the audio signal.

During the electronic device 40 executes the game application, in operation 1723, the electronic device 40 may identify occurrence of an event. For example, the event may include a notification or an alarm. In operation 1725, the electronic device 40 may transmit the event to the key operating device 10. Upon receiving the event from the electronic device 40, in operation 1727, the key operating device 10 may output the event.

Figure 18:
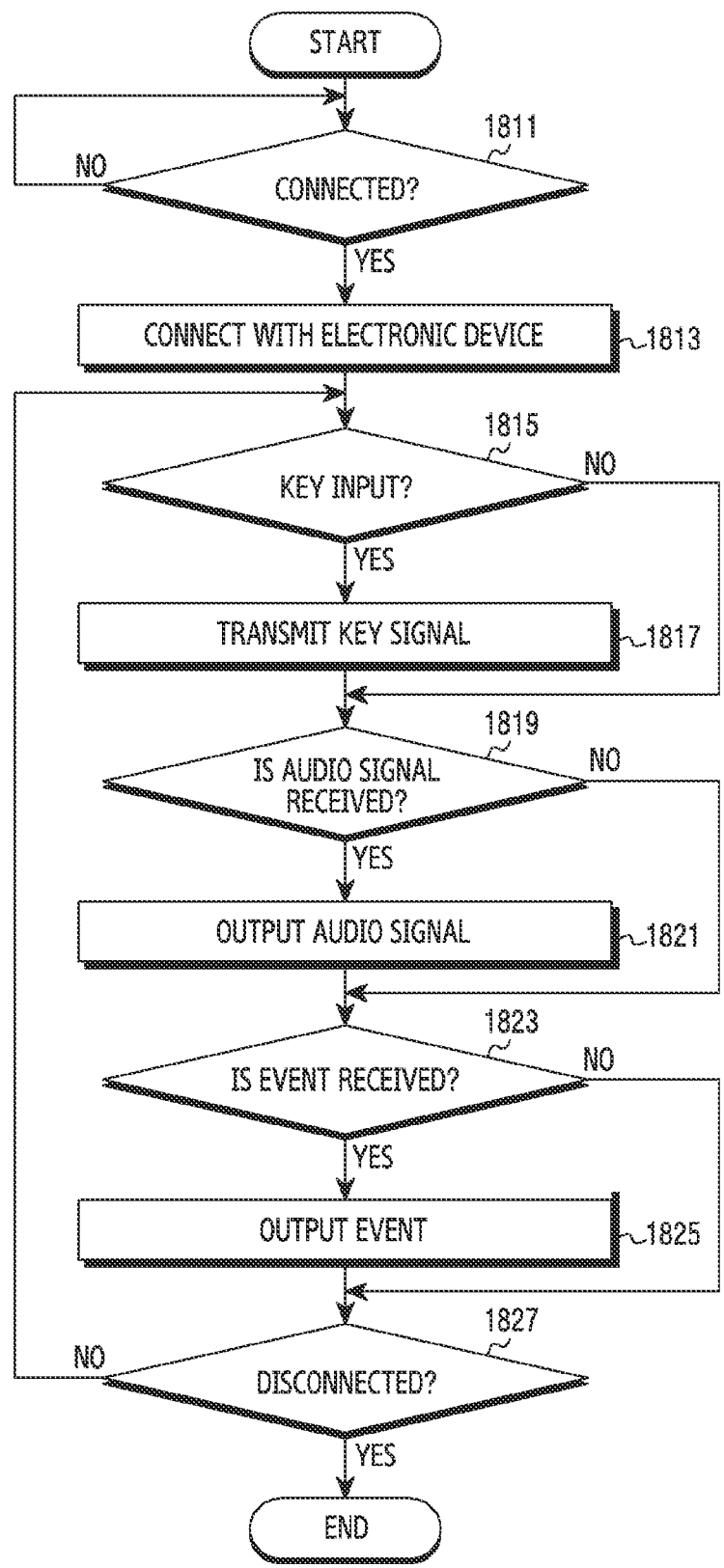
FIG. 18 is a flowchart illustrating a method of operating a key operating device according to various embodiments.

FIG. 18 is a flowchart illustrating a method of operating a key operating device according to various embodiments.

Referring to FIG. 18, in operation 1811, the key operating device 10 may detect a request for a connection with the electronic device 40. For example, if the key operating device 10 is turned on, the processor 1620 may detect the request for the connection with the electronic device 40. To this end, the input device 1650 may include a power button for turning on or off the key operating device 10. In response thereto, in operation 1813, the key operating device 10 may establish the connection with the electronic device 40 in a wireless manner. For example, the processor 1620 may establish the connection with the electronic device 40 in a wireless manner through the communication module 1690. The processor 1620 may establish the connection with the electronic device 40 through a short-range wireless communication network such as Bluetooth.

During being wirelessly connected with the electronic device 40, in operation 1815, the key operating device 10 may detect a key input. For example, the processor 1620 may detect the key input generated through the first and second operating portions 20 and 22. In operation 1817, the key operating device 10 may transmit a key signal to the electronic device 40. For example, the processor 1620 may generate the key signal related to a game application, based on the key input. The processor 1620 may transmit the key signal to the electronic device 40 through the communication module 1690. During the electronic device 40 executes the game application, the processor 1620 may transmit the key signal to the electronic device 40. Accordingly, the electronic device 40 may control the game application, based on the key signal.

During being wirelessly connected with the electronic device 40, in operation 1819, the key operating device 10 may detect an audio signal received from the electronic device 40. For example, the processor 1620 may receive the audio signal related to the game application through the communication module 1690. In operation 1821, the key operating device 10 may output the audio signal. For example, the processor 1620 may output the audio signal through the sound output device 1655. Accordingly, during the electronic device 40 executes the game application, the key operating device 10 may output the audio signal.

During being wirelessly connected with the electronic device 40, in operation 1823, the key operating device 10 may detect an event received from the electronic device 40. For example, the processor 1620 may receive the event occurring in the electronic device 40 through the communication module 1690. The event may include a notification or an alarm. In operation 1825, the key operating device 10 may output the event. For example, the processor 1620 may output the event through at least any one of the display device 1660 and the sound output device 1655. Accordingly, during the electronic device 40 executes the game application, the key operating device 10 may output the event.

In operation 1827, the key operating device 10 may detect a disconnection. For example, upon selecting a power button during being wirelessly connected with the electronic device 40, the processor 1620 may disconnect the electronic device 40 through the communication module 1690. As another example, upon receiving a request for disconnecting the key operating device 10 from the electronic device 40 through the communication module 1690, the processor 1620 may disconnect the electronic device 40 through the communication module 1690. As another example, upon disconnecting from the electronic device 40 when the electronic device 40 is turned off or an error occurs in a communication environment, the processor 1620 may detect this through the communication module 1690.

In operation 1827, upon not detecting the disconnection from the electronic device 40, the key operating device 10 may return to operation 1815. Accordingly, the key operating device 10 may repeat at least any one of operations 1815 to 1827. Therefore, a user may use the key operating device 10 to control the game application of the electronic device 40.

Various embodiments of the disclosure disclosed in the specification and the drawing are merely a specific example presented for clarity and are not intended to limit the scope of the embodiments of the disclosure. Therefore, in addition to the embodiments disclosed herein, various changes in forms and details made without departing from the technical concept of the various embodiments of the disclosure will be construed as being included in the scope of the various embodiments of the present disclosure.

The invention claimed is:

1. A key operating device comprising:
   first and second operating portions movable in a sliding manner in directions being away from or close to each other while maintaining a state of being parallel with each other;
   a seating portion disposed in an overlapping manner between the first and second operating portions while maintaining a state of being parallel with each of the first and second operating portions, and disposed to be parallel between the first and second operating portions by moving downward depending on a sliding movement of the first and second operating portions; and
   at least one connecting device which connects each of the first and second operating portions and the seating portion,
   wherein the seating portion is restricted in a downward movement when in a state of overlapping with each of the first and second operating portions, and is rotatable by means of the connecting device and thus is movable downward when it is no longer in the state of overlapping with each of the first and second operating portions,
   wherein the first operating portion comprises:
      a first support;
      a first key input portion constructed on the first support,
      a second support; and
      a second key input portion constructed on the second support, and
   wherein the second operating portion is disposed to face the first operating portion,
   when in a closed mode, the seating portion is disposed to be parallel, without overlapping, with each of the first and second key input portions, and when in an open mode, the seating portion is disposed to be parallel, without overlapping, with each of the first and second supports.

2. The key operating device of claim 1, wherein each of the first and second key input portions has substantially the same thickness as the seating portion, and each of the first and second supports has substantially the same thickness as the seating portion.

3. The key operating device of claim 2, wherein, after the seating portion moves downward, the first and second operating portions move in directions being close to each other due to restoration force of respective first and second elastic bodies.

4. The key operating device of claim 1, wherein the connecting device comprises:
   first and second hinge members disposed, when in the closed mode, in a state of being accommodated respectively in the first and second operating portions of which one ends are coupled respectively to both ends of the seating portion in a rotatable manner to provide a first hinge axis; and
   first and second sliding hinge members moving by being disposed respectively inside the first and second operating portions, and coupled to the other ends of the first and second hinge members in a rotatable manner to provide a second hinge axis spaced apart from the first hinge axis.

5. The key operating device of claim 4, wherein the first and second operating portions have first and second tension coil springs, respectively, and the first and second tension coil springs are coupled with the first and second sliding hinge members, respectively, to provide force for allowing the first and second operating portions to close.

6. The key operating device of claim 4, wherein after the seating portion moves downward, each of the first and second hinge members and each of the first and second sliding hinge members are disposed in a straight line.

7. The key operating device of claim 6, wherein after each of the first and second hinge members and each of the first and second sliding hinge members are disposed in the straight line, the first and second hinge members are hidden by being inserted respectively to the first and second operating portions.

8. The key operating device of claim 7, wherein an upper face of each of the first and second supports and an upper face of the seating portion are disposed in a coplanar state, and the electronic device is mountable to a space prepared by the first and second operating portions and the seating portion.

9. The key operating device of claim 4,
wherein the first and second operating portions respectively comprise first and second gear reduction portions, and
wherein the first and second gear reduction portions are disposed to be symmetrical about the seating portion, and are configured identically,
wherein the first reduction portion comprises:
at least one first reduction portion disposed to the first sliding hinge member; and
a first rack gear disposed to be engaged with the first gear to smoothen a sliding movement of the first operating portion.

10. The key operating device of claim 2, wherein the first and second key input portions respectively comprise first and second recesses at respective side faces facing each other to respectively insert and accommodate first and second hinge members.

11. The key operating device of claim 10,
wherein, when a first electronic device is mounted, the first and second recesses are coupled respectively with both ends of the first electronic device to hold the first electronic device, and
wherein, when a second electronic device having a size different from the first electronic device is mounted, the first and second recesses are coupled respectively with both ends of an adaptor, on which the second electronic device is mountable, to hold the second electronic device.

12. The key operating device of claim 2, wherein the first key input portion has at least one first operating keys disposed on an upper face, and the second key input portion has at least one second operating keys disposed on an upper face, and the key operating device is a game pad.

13. The key operating device of claim 1, wherein the key operating device configured as a portable wireless game pad.

14. A key operating device comprising:
a first operating portion;
a second operating portion movable away from or towards the first operating portion;
a seating portion disposed between the first operating portion and the second operating portion; and
at least one connecting device configured to connect the seating portion to the first operating portion and the second operating portion,
wherein the first operating portion comprises a first support with a first key input portion constructed thereon and a second support with a second key input portion constructed thereon,
wherein, when in a closed mode, the seating portion is disposed to be substantially parallel, without overlapping, with each of the first key input portion and the second key input portion, and
wherein, when in an open mode, the seating portion is disposed to be substantially parallel, without overlapping, with each of the first support and the second support.

15. A key operating device comprising:
a first operating portion;
a second operating portion movable away from or towards the first operating portion;
a seating portion disposed between the first operating portion and the second operating portion; and
at least one connecting device configured to connect the seating portion to the first operating portion and the second operating portion, and
wherein the first key input portion and the second key input portion comprise a first recess and a second recess, respectively, at respective side faces, and
wherein the first recess and the second recess are configured to accommodate a first hinge member and a second hinge member, respectively.

* * * * *